(12) United States Patent
Kawasumi

(10) Patent No.: US 11,754,914 B2
(45) Date of Patent: Sep. 12, 2023

(54) LIGHT SOURCE APPARATUS AND IMAGE PROJECTION APPARATUS

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 17/388,780

(22) Filed: Jul. 29, 2021

(65) Prior Publication Data

US 2022/0043330 A1 Feb. 10, 2022

(30) Foreign Application Priority Data

Aug. 5, 2020 (JP) .................... 2020-132927

(51) Int. Cl.
  *G03B 21/00* (2006.01)
  *G03B 21/20* (2006.01)
  *G03B 21/16* (2006.01)

(52) U.S. Cl.
  CPC ......... *G03B 21/2013* (2013.01); *G03B 21/16* (2013.01); *G03B 21/208* (2013.01); *G03B 21/2033* (2013.01)

(58) Field of Classification Search
  CPC ............. G03B 21/2013; G03B 21/16; G03B 21/2033; G03B 21/208
  See application file for complete search history.

(56) References Cited

U.S. PATENT DOCUMENTS

| 2012/0307212 | A1* | 12/2012 | Enomoto | G03B 21/2033 353/52 |
| 2013/0070208 | A1* | 3/2013 | Nakanishi | G03B 21/16 353/31 |
| 2014/0085612 | A1* | 3/2014 | Wu | G03B 21/2033 353/57 |
| 2020/0401027 | A1* | 12/2020 | Zhao | G03B 21/2033 |

FOREIGN PATENT DOCUMENTS

| JP | 2009-186701 A | 8/2009 |
| JP | 2011-090310 A | 5/2011 |
| JP | 2019-061110 A | 4/2019 |

* cited by examiner

*Primary Examiner* — Gerald J Sufleta, II
(74) *Attorney, Agent, or Firm* — CANON U.S.A., INC. IP Division

(57) ABSTRACT

An apparatus includes at least one first light emitting element configured to emit blue light, a plurality of second light emitting elements each configured to emit green light, a plurality of third light emitting elements each configured to emit red light, a first cooling unit configured to cool the at least one first light emitting element and the plurality of second light emitting elements, and a second cooling unit configured to cool the plurality of third light emitting elements.

20 Claims, 5 Drawing Sheets

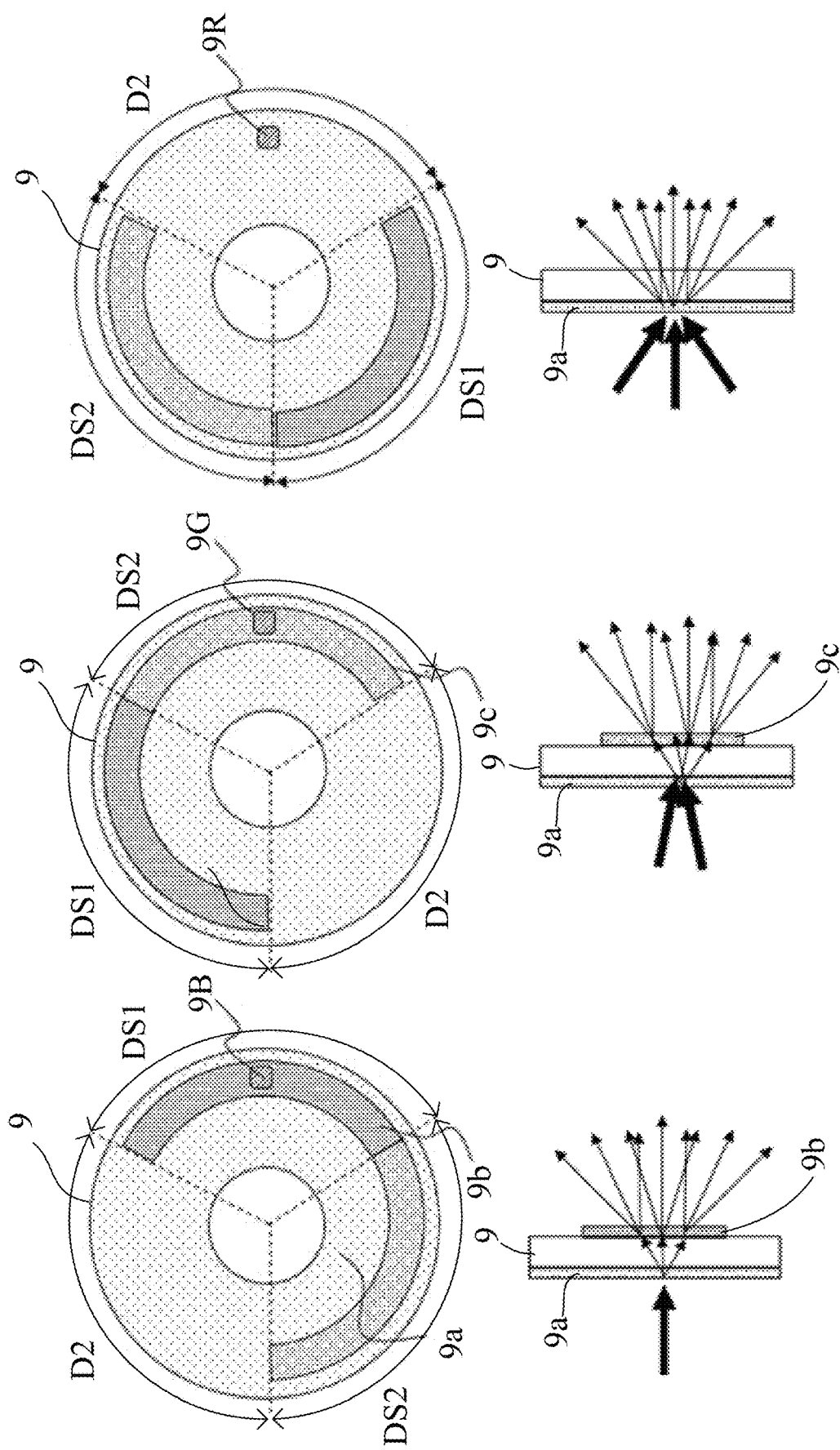

LIGHT SOURCE APPARATUS AND IMAGE PROJECTION APPARATUS

BACKGROUND OF THE DISCLOSURE

Field of the Disclosure

The aspect of the embodiments relates to a light source apparatus and an image projection apparatus.

Description of the Related Art

One conventional light source apparatus used for an image projection apparatus is a light source apparatus including laser light sources of three primary colors of red, green, and blue. Japanese Patent Laid-Open No. 2019-61110 discloses a configuration that arranges three green laser light sources and three red laser light sources around one blue laser light source in a centro-symmetrical manner so as to enclose the blue laser light source, and integrally holds these laser light sources through a cooling heat sink. This configuration can integrate the laser light sources of the three primary colors of red, green, and blue, and thus is suitable for a compact image projection apparatus.

Where the laser light sources of multiple colors are arranged on a common heat sink and integrated with one another, it is difficult to maintain a color balance, for example, when the light source output is changed, because the output balance destroys due to a difference in temperature characteristic among the laser light sources of the respective colors.

SUMMARY OF THE DISCLOSURE

An apparatus according to one aspect of the embodiments includes at least one first light emitting element configured to emit blue light, a plurality of second light emitting elements each configured to emit green light, a plurality of third light emitting elements each configured to emit red light, a first cooling unit configured to cool the at least one first light emitting element and the plurality of second light emitting elements, and a second cooling unit configured to cool the plurality of third light emitting elements. An image projection apparatus having the above apparatus also constitutes another aspect of the embodiments.

Further features of the disclosure will become apparent from the following description of exemplary embodiments with reference to the attached drawings.

BRIEF DESCRIPTION OF THE DRAWINGS

FIGS. 5A to 5C are block diagrams of the rotating diffuser in this embodiment.

DESCRIPTION OF THE EMBODIMENTS

Referring now to the accompanying drawings, a detailed description will be given of embodiments according to the disclosure.

Figure 1:
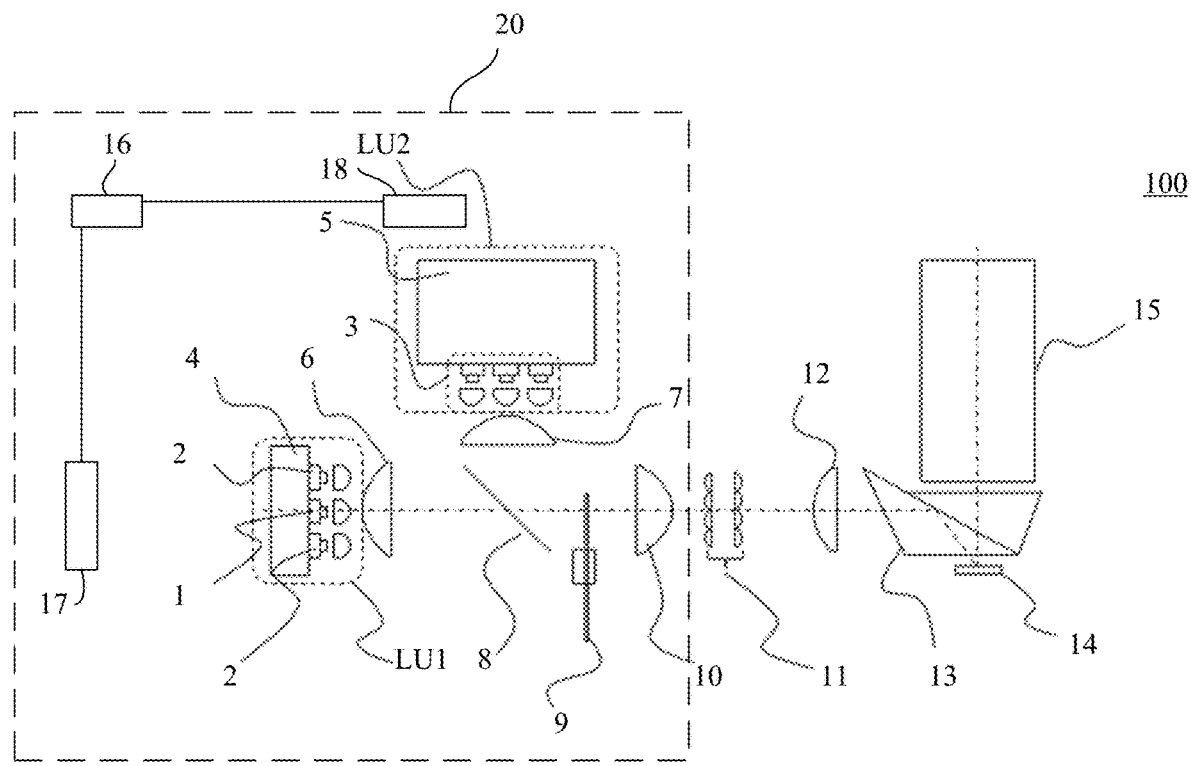
FIG. 1 is a configuration diagram of an image projection apparatus according to this embodiment.

Referring now to FIG. 1, a description will be given of an image projection apparatus (projector) according to this embodiment. FIG. 1 is a configuration diagram of an image projection apparatus 100. The image projection apparatus 100 includes a light source apparatus 20, a fly-eye lens 11, a condenser lens 12, a total reflection prism 13, an image display element 14, and a projection lens (projection optical system) 15. The light source apparatus 20 includes a first light source unit LU1, a second light source unit LU2, condenser lenses 6 and 7, a dichroic mirror 8, a rotating diffuser (rotating diffusion plate) 9, a collimator lens 10, and a cooling control unit 16, a first fan 17, and a second fan 18. The first light source unit LU1 includes a blue laser light source (first light emitting element) 1, a green laser light source (second light emitting element) 2, and a heat sink (first cooling unit) 4. The second light source unit LU2 includes a red laser light source (third light emitting element) 3 and a heat sink (second cooling unit) 5.

In the light source apparatus 20 according to this embodiment, the light source unit formed by the blue laser light source 1 and the green laser light source 2, and the light source unit formed by the red laser light source 3 are separate light source units. That is, the blue laser light source 1 and the green laser light source 2 constitute the first light source unit LU1, and the red laser light source 3 constitutes the second light source unit LU2. Each light source unit has a dedicated heat sink (cooling unit). The blue laser light source 1 and the green laser light sources 2 are cooled by the heat sink 4, and the red laser light sources 3 are cooled by the heat sink 5. The first fan 17 fans wind to the heat sink 4. The second fan 18 fans wind to the heat sink 5. The cooling control unit 16 independently controls air volumes of the first fan 17 and the second fan 18.

The light (blue light, green light, and red light) emitted from the first light source unit LU1 and the second light source unit LU2 is condensed and incident on the rotating diffuser 9 via the condenser lenses 6 and 7, respectively. The light of each color is combined by the dichroic mirror 8 that reflects the red light and transmits the blue light and the green light. The rotating diffuser 9 diffuses an incident laser beam by rotating a circular diffuser with a motor, and temporally changes a diffusing pattern so as to restrain speckles from being projected onto a projection surface (screen). The diffused light emitted from the rotating diffuser 9 is collimated by the collimator lens 10 and emitted from the light source apparatus 20. The emitted diffused light is uniformly and rectangularly shaped by the fly-eye lens 11, reflected by the total reflection prism 13 through the condenser lens 12, and then superimposed on the image display element 14. In this embodiment, the fly-eye lens 11, the condenser lens 12, and the total reflection prism 13 constitute an illumination optical system that illuminates the image display element 14 with the light emitted from the light source apparatus 20.

The total reflection prism 13 is an element in which two prisms are joined via an air gap (air gap layer) of about 10 μm, and the light incident on the air gap layer causes a total reflection and the optical path is bent. The bent light enters the image display element 14. In this embodiment, the image display element 14 is a digital micromirror device (DMD). In the DMD, a plurality of pixels constituting an image include micromirrors, and the plurality of micromirrors are spread over one surface to form an image display area as one plane. A plurality of micromirrors are switched between two tilt positions, i.e., an ON state and an OFF state, according to the image information. Illumination light is obliquely introduced onto the image display area at a right angle relative to the rotation axis of the micromirror and at a desired angle (generally 34°) relative to the normal of the image display area. Thereby, in the ON state, the light beam is reflected in the substantially normal direction (0°) of the image display area of the DMD, and the image is projected through the projection lens 15. In the OFF state, the light beam is reflected to the outside of the projection optical path and treated as unnecessary light. High-speed switching between the ON state and the OFF state in one frame of the image information can express the gradation and display an image. The image light modulated by the image display element 14 is projected onto the projection surface via the projection lens 15.

In this embodiment, the blue laser light source 1, the green laser light sources 2, and the red laser light sources 3 in the light source apparatus 20 are sequentially turned on in time (that is, the light emitting element of each color is turned on in a time division manner). Therefore, the DMD can project a full-color visible image by sequentially performing a modulation corresponding to each colored light according to the lighting timing of each laser light source.

Figures 2A, 2B:
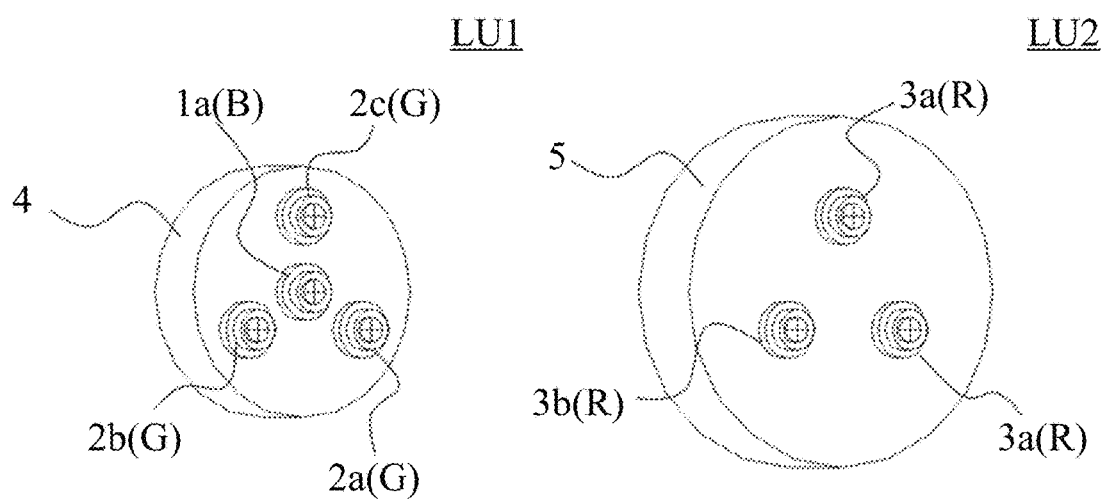
FIGS. 2A and 2B are detailed views of a first light source unit and a second light source unit in this embodiment.

Referring now to FIGS. 2A and 2B, a description will be given of the first light source unit LU1 and the second light source unit LU2. FIG. 2A is a detailed view of the first light source unit LU1 having the blue laser light source 1 and the green laser light sources 2. FIG. 2B is a detailed view of the second light source unit LU2 having the red laser light sources 3. The blue laser light source 1, the green laser light sources 2, and the red laser light sources 3 each include a CAN package type semiconductor laser. The center wavelength of the blue laser light source 1 is 455 nm, the center wavelength of the green laser light source 2 is 525 nm, and the center wavelength of the red laser light source 3 is 640 nm.

The blue laser light source 1 includes at least one first light emitting element that emits blue light. The green laser light sources 2 include a plurality of second light emitting elements that emit green light. The red laser light sources 3 include a plurality of third light emitting elements that emit red light. In this embodiment, the first light source unit LU1 has one blue laser light source 1a and three green laser light sources 2a, 2b, and 2c. The second light source unit LU2 has three red laser light sources 3a, 3b, and 3c. However, this embodiment is not limited to this example, as long as the number of green laser light sources 2 is larger than that of blue laser light sources 1 and the number of red laser light sources 3 is larger than that of blue laser light sources 1.

The first light source unit LU1 is configured so that one blue laser light source 1a as the center is surrounded by the green laser light sources 2a, 2b, and 2c in a centro-symmetrical manner and they are integrated by the heat sink 4. In the second light source unit LU2, the red laser light sources 3a, 3b, and 3c are arranged in a centro-symmetrical manner similar to the green laser light sources 2a, 2b, and 2c, and integrated by the heat sink 5. The above example is suitable for a ratio among the number of the laser light sources of the emission colors so as to optimize the white balance of the projection light. A description will now be given of the reasons for it with reference to FIGS. 3A to 3C.

Figures 3A, 3B, 3C:
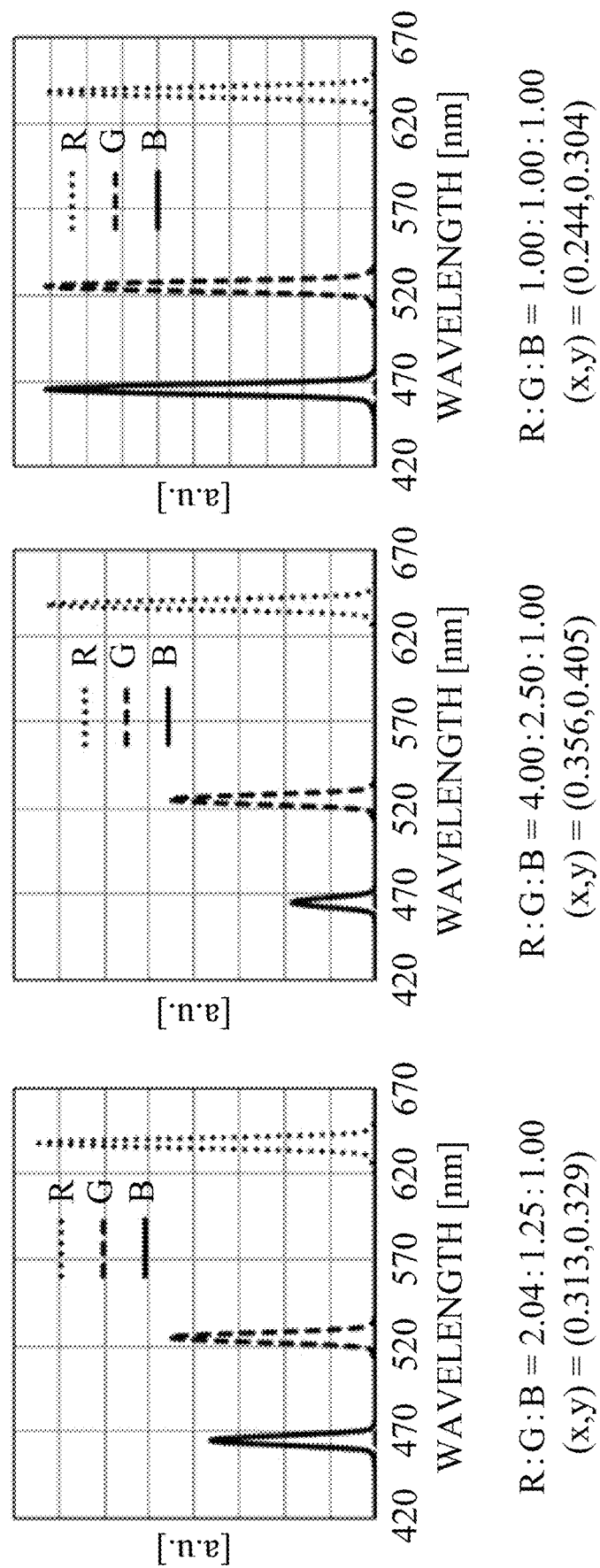
FIGS. 3A to 3C are explanatory diagrams of a light amount balance that realizes a proper white balance in this embodiment.

FIGS. 3A to 3C are explanatory diagrams of a light amount balance that realizes a proper white balance according to this embodiment. FIGS. 3A to 3C illustrate spectral distributions of the wavelengths of the blue laser light source 1, the green laser light source 2, and the red laser light source 3, and how the white balance changes depending on the power ratio. For example, as illustrated in FIG. 3A, when D65 (x: 0.3127, y: 0.329), which is generally used for a reference value for white balance of a display device, is set to a target chromaticity, the power ratio among red, green, and blue laser light beams is R: G: B=2.04: 1.25: 1.00.

The light emission efficiency of the semiconductor laser (laser light source) differs for each emission color. For example, both the blue laser light source 1 and the green laser light source 2 use InGaN for the light emitting layer, but if the In content ratio is increased in order to change the light emission wavelength from the blue light to green light, the crystal structure is distorted and the efficiency is likely to lower. The light emission efficiency of the green laser light source 2 is about one-fourth to one-fifth as high as that of the high-efficiency blue laser light source 1.

AlInGaP is mainly used for the light emitting layer of the red laser light source 3. Its light emission efficiency at room temperature is close to that of the blue laser light source 1, but its ratio of the output decrease to the temperature increase is larger. When it is used at a temperature of about 45° C., the blue laser light source 1 can maintain an efficiency of about 90%, but the red laser light source 3 maintains an efficiency of only about 70%. Therefore, when the power ratio based on the white balance and the light emission efficiency and characteristic of each color of the semiconductor laser are considered, the number of blue laser light sources 1 having the highest output is the smallest, and the number of red laser light sources 3 and the number of green laser light sources 2 are larger. In this embodiment, the number of red laser light sources 3 and the number of green laser light sources 2 are the same number (or three), but the number of red laser light sources 3 and the number of green laser light sources 2 may be differently set depending on the conditions.

A description will be given of the heat sink 4 of the first light source unit LU1 and the heat sink 5 of the second light source unit LU2. As described above, InGaN is used as the light emitting layers for the blue laser light source 1 and the green laser light source 2, whereas AlInGaP is mainly used as the light emitting layer for the red laser light source 3. The red laser light source 3 has not only a larger ratio of the output decrease to the temperature increase than that of the blue laser light source 1 and the green laser light source 2, but also a different proper temperature setting range from that of them. In particular, since the red laser light source 3 is vulnerable to high temperatures, it tends to be set to a lower temperature than the blue laser light source 1 and the green laser light source 2.

Thus, this embodiment independently provides the heat sink 4 of the first light source unit LU1 and the heat sink 5 of the second light source unit LU2 so as to independently control their temperatures. This configuration treats the light sources having similar changing behaviors of the light emission efficiency as a single light source unit and can independently control the temperature of each light source unit. This configuration can suppress the deterioration of the color balance of the light emitted from the light source apparatus 20, and improve the controllability of the color balance of the emitted light when the light source output is changed and the temperature of the light source significantly changes.

This embodiment does not assign each of the blue laser light source 1, the green laser light source 2, and the red laser light source 3 to a separate light source unit, but assign the blue laser light source 1 and the green laser light sources 2 to the integrated light source unit LU1 and the red laser light sources 3 to the integrated light source unit LU2. Thus, the light source apparatus 20 can be made relatively compact, and the number of light sources can be well-balanced and properly arranged in each light source unit. Since the light beams emitted from these light source are combined by the dichroic mirror 8, the light beam diameter can be made smaller than that of the conventional configuration.

In this embodiment, the heat sink 5 for the second light source unit LU2 is larger in size than the heat sink 4 for the first light source unit LU1. That is, the heat sink 5 has a cooling capacity higher than that of the heat sink 4. Thereby, even if the red laser light source 3 is required to have a lower temperature setting condition than that of the blue laser light source 1 and the green laser light source 2, it is not necessary to increase the air volume to the heat sink 5, and the noise of the light source apparatus 20 and the like can be suppressed. In addition, the temperature controllability over the red laser light source 3 can be further improved. In order to enhance the cooling capacity of the heat sink, this embodiment pays attention to the size of each heat sink, but the disclosure is not limited to this embodiment. For example, the attention may be paid to the thermal conductivity of each heat sink. In this case, the heat sink 5 may be made of a material having a thermal conductivity higher than the heat sink 4. In this embodiment, the material of the heat sink is aluminum, but using a material having a higher thermal conductivity such as copper can enhance the cooling capacity. Alternatively, the attention may be paid to the air volume sent from each fan to each heat sink. The cooling control unit 16 may make the air volume of the second fan 18 larger than that of the first fan 17. Alternatively, the first light source unit LU1 may be an air cooling unit, and the second light source unit LU2 may be a liquid cooling unit.

This embodiment independently provides the first light source unit LU1 (heat sink 4) and the second light source unit LU2 (heat sink 5). The optical paths (first optical path and second optical path) for condensing the light beams emitted from these light source units on the rotating diffuser 9 are different. In this embodiment, the focal length of the condenser lens (first optical system) 6 that condenses the blue light and the green light on the rotating diffuser 9 and the focal length of the condenser lens (second optical system) 7 that condenses the red light on the rotating diffuser 9 may be different from each other. The reasons will be described below.

As described above, InGaN is used as the light emitting layers for the blue laser light source 1 and the green laser light source 2, and AlInGaP is mainly used as the light emitting layer for the red laser light source 3. Here, the size of the light emitting surface of the light emitting layer itself often differs depending on the design of the light emitting element. In this embodiment, when the image from each laser light source is condensed on the rotating diffuser 9, an image of the light emitting surface of each laser light source is formed on the rotating diffuser 9.

Figures 4A, 4B, 4C:
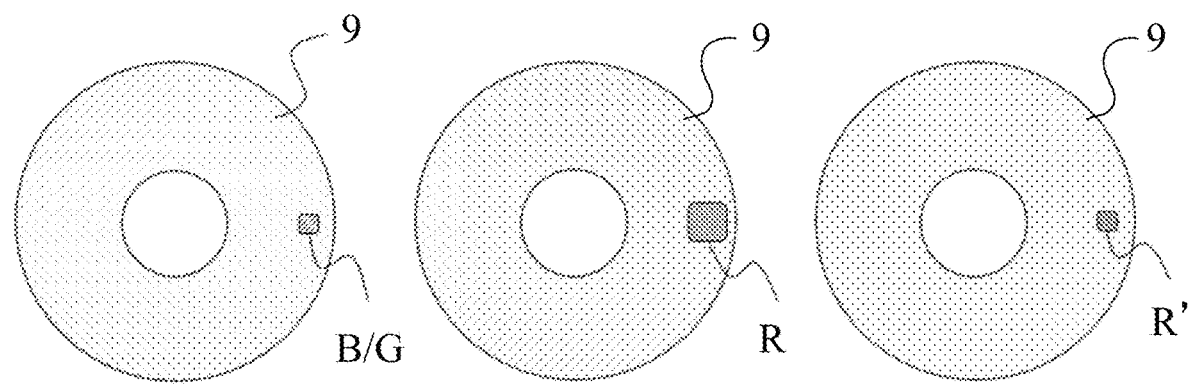
FIGS. 4A to 4C illustrate examples of a condensed spot on a rotating diffuser in this embodiment.

FIGS. 4A to 4C illustrate examples of a condensed spot on the rotating diffuser 9. FIG. 4A illustrates a state of the condensed spot when the blue light B and the green light G are condensed on the rotating diffuser 9, and FIG. 4B illustrates a state of the condensed spot when the red light R is condensed on the rotating diffuser 9. As the size of the light source image on the rotating diffuser 9 becomes larger, the illumination efficiency becomes lower in the subsequent illumination optical system and the loss increases. As described above, if the size of the light source image is different for each color of the blue light, the green light, and the red light, the efficiency difference occurs in the illumination optical system for each color, so that the color balance may be deviated from the intended state on the image display element 14 or the screen and the color may become uneven. In particular, the output of the red laser light source 3 is unstable against the temperature change. Therefore, in order to secure an output margin, the red laser light source 3 tends to have a larger size of the light emitting surface in the light source than that of each of the blue laser light source 1 and the green laser light source 2, and the condensed spot tends to be larger on the diffuser.

Accordingly, this embodiment makes different the focal length of the condenser lens 6 that condenses the light beam from the first light source unit LU1 on the rotating diffuser 9 and the focal length of the condenser lens 7 that condenses the light beam from the second light source unit LU2 on the rotating diffuser 9. The focal length of the condenser lens 7 may be shorter than that of the condenser lens 6 in consideration of the size of the light emitting surface of the red laser light source 3. Thereby, as illustrated in FIG. 4C, the imaging magnification of the light source image of the condensed spot on the rotating diffuser 9 of the red laser light source 3 is made smaller than that of the blue laser light source 1 and the green laser light source 2, and the influence of the difference in the size of the light emitting surface of the original light source can be restrained. As a result, the color imbalance and color unevenness caused by it are suppressed.

This embodiment makes different the focal length of the first optical path from the first light source unit LU1 to the rotating diffuser 9 and the focal length of the second optical path from the second light source unit LU2 to the rotating diffuser 9 using the lenses 6 and 7 that make different the focal lengths of the first optical path and the second optical path. However, this embodiment is not limited to this configuration. For example, the lens may be shared on a common optical path of the first optical path and the second optical path (such as in front of the rotating diffuser 9). Condensing light with only a single lens tends to cause the spherical aberration, which causes a decrease in efficiency and thus a plurality of lenses may be used. If a plurality of lenses are arranged in each optical path, the light source apparatus 20 becomes larger. Accordingly, this embodiment makes different the focal length of the first optical path and the focal length of the second optical path, simplifies the light source apparatus 20, and shortens the overall length, for example, by setting a positive lens to an independent lens on each optical path and a concave lens to a common lens.

As described above, this embodiment makes different the focal length of the condenser lens 6 that condenses the light beam from the first light source unit LU1 on the rotating diffuser 9 and the focal length of the condenser lens 7 that condenses light beam from the second light source unit LU2 on the rotating diffuser 9. In particular, the focal length of the condenser lens 7 is shortened in consideration of the size of the light emitting surface of the red laser light source 3. As illustrated in FIGS. 2A and 2B, among the light sources arranged in a centro-symmetrical manner, the position of the outer peripheral light source is substantially the same between the first light source unit LU and the second light source unit LU2 and thus the diameter of the light beam emitted from each light source unit is almost the same. In this case, the second light source unit LU2 that condenses the light on the rotating diffuser 9 with a shorter focal length, that is, or the red light has a large condensing angle on the rotating diffuser 9.

If it is assumed that the rotating diffuser 9 is a diffuser having the same diffusivity in the plane, the difference in incident angle is reflected on a difference in diffusion angle, so that the second light source unit LU2, that is, the red light has a diffusion angle larger than that of the first light source unit LU1. These diffused light beams are collimated by the collimator lens 10 and enter the fly-eye lens 11. At this time, the distribution of the red light having the large diffusion angle is distributed over the entire lens array surface of the fly-eye lens 11, but the light from the first light source unit LU1 having a small diffusion angle tends to distribute near the optical axis of the fly-eye lens 11. When the light distribution having the difference for each color is superimposed on the image display element 14, the color becomes uneven in the illumination distribution on the image display element 14, that is, the projected image.

The color unevenness can be reduced by increasing the diffusivity of the rotating diffuser 9 and by distributing the light from the first light source unit LU1 over the entire lens array surface of the fly-eye lens 11. However, the diffusivity is excessive relative to the light from the second light source unit LU2, which originally has a large light beam width. Then, the light beam is shielded by the outer shape of the fly-eye lens 11 or becomes difficult to be taken in the projection lens 15, and the light amount decreases.

On the other hand, in this embodiment, the rotating diffuser 9 has a first diffusion area which the blue light and the green light enter and a second diffusion area D2 which the red light enters, and the second diffusion area D2 has a diffusivity smaller than that of the first diffusion area. Thereby, the color unevenness can be suppressed. The configuration according to this embodiment can use the diffusivity of the rotating diffuser 9 to correct a difference in incident angle on the rotating diffuser 9 caused by a difference in focal length between the condenser lenses 6 and 7. Therefore, a difference in diffusion angle between the first light source unit LU1 and the second light source unit LU2 can be reduced, and the color unevenness can be suppressed.

In this embodiment, the first diffusion area which the light from the first light source unit LU1 enters may include a first sub-diffusion area DS1 which the blue light enters and a second sub-diffusion area DS2 which the green light enters. The second sub-diffusion area DS2 has a diffusivity smaller than that of the first sub-diffusion area DS1, and the second diffusion area D2 has a diffusivity smaller than that of the second sub-diffusion area DS2. That is, the following expression (1) is satisfied:

$$DS1 > DS2 > D2 \quad (1)$$

As described above, the number of blue laser light sources 1 is smaller than the number of green laser light sources 2. The condensing angle and the diffusion angle on the rotating diffuser 9 differ depending on the diameter of the light beam before it enters the rotating diffuser 9. Thus, the diffusion angle of the blue laser light source 1 is smaller than that of the green laser light source 2. Accordingly, the first diffusion area which the blue light and the green light enter includes the first sub-diffusion area DS1 which the blue light enters and the second sub-diffusion area DS2 which the green light enters so as to reduce a diffusion angle of the green light relative to the blue light. That is, reducing the diffusivity of the second sub-diffusion area DS2 can reduce the differences in the diffusion angles among the blue light, the green light, and the red light emitted from the rotating diffuser 9. Thereby, the color unevenness can be further suppressed.

Referring now to FIGS. 5A to 5C, a description will be given of the configuration of the rotating diffuser 9 and the state of the incident light. FIGS. 5A to 5C are explanatory views of the configuration of the rotating diffuser 9 and the incident light. The rotating diffuser 9 forms a surface having the diffusivity on a first surface (light incident surface) of a circular glass substrate. The glass substrate is, for example, white plate glass, optical glass, or borosilicate glass having an excellent heat resistance, but is not limited to this example. The surface having the diffusivity may be structured such as frosted glass or a microlens array. Compared with the frosted glass, a structure such as the microlens can enhance the transmittance, and precisely control the diffusivity using a lens shape. Alternatively, for economical manufacturing, a diffusion paste (diffusion material) in which diffusion particles are dispersed in a binder may be applied. An antireflection film may be applied to these diffusion surfaces in order to improve the transmittance.

FIGS. 5A, 5B, and 5C illustrate phase states of the rotating diffuser 9 at the timings at which the blue light, the green light, and the red light are incident, respectively. Reference numerals 9B, 9G, and 9R in FIGS. 5A, 5B, and 5C illustrate condensed spots (condensed light) of the blue light, the green light, and the red light on the rotating diffuser 9, respectively. The rotating diffuser 9 according to this embodiment has a substrate (base material) 9a having a basic diffusivity.

In this embodiment, as illustrated in FIGS. 5A, 5B, and 5C, the rotating diffuser 9 includes the first sub-diffusion area DS1 having a diffusivity larger than that of another area, in an area corresponding to a light emission timing of the first light emitting element, that is, a timing at which the blue light is incident. The rotating diffuser 9 further includes the second sub-diffusion area DS2 having a diffusivity smaller than that of the first sub-diffusion area DS1, in an area corresponding to the light emission timing of the second light emitting element, that is, a timing at which green light is incident. The rotating diffuser 9 further includes the second diffusion area D2 having the smallest diffusivity among the areas, in an area corresponding to the light emission timing of the third light emitting element, that is, the timing at which the red light enters the rotating diffuser 9.

The first sub-diffusion area DS1 and the second sub-diffusion area DS2 are made by applying a diffusion paste (diffusion materials 9b and 9c) in which a binder is mixed with diffusion particles to a surface on the light emitting side of the substrate 9a having the basic diffusivity of the second diffusion area. Thereby, in addition to the basic diffusivity of the substrate 9a, the diffusivity of the diffusion paste is added in the first diffusion area, and thus it has a diffusivity larger than that of the second diffusion area D2 (the area of the substrate 9a) as another area.

In the first sub-diffusion area DS1 and the second diffusion area DS2, the diffusion rate is controlled by changing the ratio of the diffusion particles mixed in the diffusion paste. This configuration can easily control the diffusivity by the content of diffused particles, etc. Thus, a more suitable, simpler, and easier to manufacture configuration can be implemented than a configuration that processes a substrate and provides a special diffusion structure, such as a microlens, on both sides. Instead of the diffusion paste, a structure that provides the diffusivity may be used as described above.

This embodiment provides the first diffusion area corresponding to the timing at which the light from the first light emitting element is incident and the second diffusion area D2 corresponding to the timing at which the light from the second light emitting element is incident, in a rotating direction of the rotating diffuser 9. The diffusivity of the first diffusion area is larger than that of the second diffusion area D2. This configuration can reduce a diffusion angle from the rotating diffuser 9 caused by a difference in focal length between the condenser lenses 6 and 7 from the first and second optical paths to the rotating diffuser 9 and a difference in the number of light sources, that is, the color unevenness generated in the illumination optical system.

This embodiment assumes a single plate method using one image display element 14 and thus provides different diffusion areas along the rotating direction in the rotating diffuser 9, but is not limited to this example. For example, in a three-plate structure using three image display elements 14, it is assumed that the blue light, the green light, and the red light in the light sources are not sequentially turned on in a time-division manner, but are always turned on. In this case, the diffusion area corresponding to each light source is disposed in an annular shape in the circumferential direction rather than the rotating direction, and the irradiation positions of the blue light, the green light, and the red light on the rotating diffuser 9 may be different. This configuration can also be relatively easily realized by applying diffusion pastes having different diffusivities to different areas in a substrate having a basic diffusivity in an annular shape as described above.

This embodiment can provide a light source apparatus and an image projection apparatus, each of which can improve the color balance among light emitting elements that emit the blue light, the green light, and the red light.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, this embodiment uses a single blue laser light source, but may use a plurality of blue laser light sources. Then, the number of green laser light sources and red laser light sources may be increased for the color balance as the number of blue laser light sources increases. For example, this embodiment is applicable to another package rather than the CAN package.

Figures 6A, 6B:
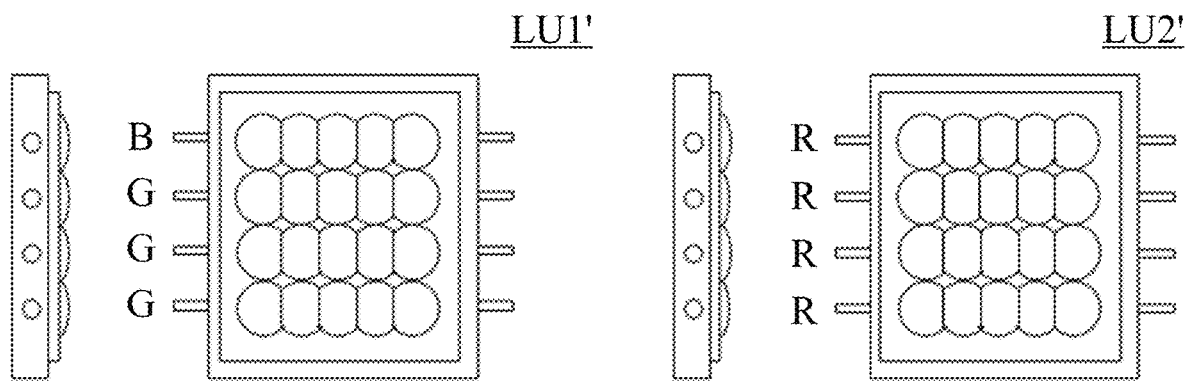
FIGS. 6A and 6B are detailed views of a first light source unit and a second light source unit as a modification.

Referring now to FIGS. 6A and 6B, a description will be given of a first light source unit LU1' and a second light source unit LU2' which are assumed to have high luminances. FIGS. 6A and 6B are detailed views of the first light source unit LU1' and the second light source unit LU2' according to a modification. As illustrated in FIGS. 6A and 6B, assume each of the first light source unit LU1' and the second light source unit LU2' includes a package of 5 pieces times 4 systems. The first light source unit LU1' illustrated in FIG. 6A sets the blue laser light source B to one system and the green laser light sources G to three systems. The second light source unit LU2' illustrated in FIG. 6B sets the red laser light sources R to all four systems. Then, the blue laser light source and the green laser light sources can be integrated for miniaturization, and the red laser light source can be independently cooled, which has a temperature characteristic to be controlled. Therefore, the controllability over the color balance can be improved when the color balance and the light source output are changed. In addition, a light output of the light source apparatus can be further increased and thus a brighter image projection apparatus can be implemented.

The diffusivity of the diffuser (rotating diffuser 9) can be verified as follows. For example, when a highly parallel light beam such as a laser beam enters a diffuser, the diffusivity can be verified by the spread of the luminance distribution of the diffused light projected on a distant screen. That is, a large diffusivity means a wide spread of the luminance distribution, and a small diffusivity means a narrow spread of the intensity distribution. When the luminance distribution is Gaussian-like in which the central intensity is high and peripheral intensity gradually decreases, the spread can be defined by the intensity range of 1/e against the peak intensity.

This application claims the benefit of Japanese Patent Application No. 2020-132927, filed on Aug. 5, 2020, which is hereby incorporated by reference herein in its entirety.

What is claimed is:

1. An apparatus comprising:
at least one first light emitting element configured to emit blue light;
a plurality of second light emitting elements each configured to emit green light;
a plurality of third light emitting elements each configured to emit red light;
a first cooling unit configured to cool the at least one first light emitting element and the plurality of second light emitting elements, the first cooling unit being commonly used for the at least one first light emitting element and the plurality of second light emitting elements; and
a second cooling unit configured to cool the plurality of third light emitting elements,
wherein the first cooling unit and the second cooling unit are provided independently from each other.

2. The apparatus according to claim 1, wherein a number of second light emitting elements is larger than that of first light emitting elements, and
wherein a number of third light emitting elements is larger than that of first light emitting elements.

3. The apparatus according to claim 1, wherein the second cooling unit has a cooling capacity higher than that of the first cooling unit.

4. The apparatus according to claim 3, wherein the second cooling unit is larger in size than the first cooling unit.

5. The apparatus according to claim 3, wherein the second cooling unit is made of a material having a thermal conductivity higher than that of the first cooling unit.

6. The apparatus according to claim 3, further comprising:
a first fan configured to send air to the first cooling unit;
a second fan configured to send air to the second cooling unit; and
a control unit configured to independently control an air volume of each of the first fan and the second fan,
wherein the air volume of the second fan is larger than that of the first fan.

7. The apparatus according to claim 1, further comprising:
a diffuser which the blue light, the green light, and the red light enter;
a first optical system configured to condense the blue light and the green light on the diffuser; and
a second optical system configured to condense the red light on the diffuser,
wherein the first optical system and the second optical system have focal lengths different from each other.

8. The apparatus according to claim 7, wherein the second optical system has a focal length shorter than that of the first optical system.

9. The apparatus according to claim 7, wherein the diffuser has a first diffusion area which the blue light and the green light enter, and a second diffusion area which the red light enters, and
wherein the second diffusion area has a diffusivity smaller than that of the first diffusion area.

10. The apparatus according to claim 9, wherein the first diffusion area includes a first sub-diffusion area which the blue light enters and a second sub-diffusion area which the green light enters, wherein the second sub-diffusion area has a diffusivity smaller than that of the first sub-diffusion area, and wherein the second diffusion area has a diffusivity smaller than that of the second sub-diffusion area.

11. The apparatus according to claim 1, wherein each of the at least one first light emitting element, the plurality of second light emitting elements, and the plurality of third light emitting elements includes a laser light source.

12. A projection apparatus comprising:
a light source apparatus;
a display element; and
an optical system configured to illuminate the display element with light from the light source apparatus,
wherein the light source apparatus includes:
at least one first light emitting element configured to emit blue light;
a plurality of second light emitting elements each configured to emit green light;
a plurality of third light emitting elements each configured to emit red light;
a first cooling unit configured to cool the at least one first light emitting element and the plurality of second light emitting elements, the first cooling unit being commonly used for the at least one first light emitting element and the plurality of second light emitting elements; and
a second cooling unit configured to cool the plurality of third light emitting elements,
wherein the first cooling unit and the second cooling unit are provided independently from each other.

13. The projection apparatus according to claim 12,
wherein a number of second light emitting elements is larger than that of first light emitting elements, and
wherein a number of third light emitting elements is larger than that of first light emitting elements.

14. The projection apparatus according to claim 12, wherein the second cooling unit has a cooling capacity higher than that of the first cooling unit.

15. The projection apparatus according to claim 14, wherein the second cooling unit is made of a material having a thermal conductivity higher than that of the first cooling unit.

16. The projection apparatus according to claim 14, further comprising:
a first fan configured to send air to the first cooling unit;
a second fan configured to send air to the second cooling unit; and
a control unit configured to independently control an air volume of each of the first fan and the second fan,
wherein the air volume of the second fan is larger than that of the first fan.

17. The projection apparatus according to claim 12, further comprising:
a diffuser which the blue light, the green light, and the red light enter;
a first optical system configured to condense the blue light and the green light on the diffuser; and
a second optical system configured to condense the red light on the diffuser,
wherein the first optical system and the second optical system have focal lengths different from each other.

18. The projection apparatus according to claim 17, wherein the second optical system has a focal length shorter than that of the first optical system.

19. The projection apparatus according to claim 17,
wherein the diffuser has a first diffusion area which the blue light and
the green light enter, and a second diffusion area which the red light enters, and
wherein the second diffusion area has a diffusivity smaller than that of the first diffusion area.

20. The projection apparatus according to claim 12, wherein each of the at least one first light emitting element, the plurality of second light emitting elements, and the plurality of third light emitting elements includes a laser light source.

* * * * *